United States Patent
Hailpern et al.

(10) Patent No.: US 10,445,416 B2
(45) Date of Patent: Oct. 15, 2019

(54) DIGITAL NOTE MANIPULATION

(71) Applicant: Hewlett-Packard Development Company, L.P., Houston, TX (US)

(72) Inventors: Joshua Hailpern, Sunnyvale, CA (US); Rares Vernica, Palo Alto, CA (US); Shanchan Wu, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 211 days.

(21) Appl. No.: 15/321,138

(22) PCT Filed: Jul. 2, 2014

(86) PCT No.: PCT/US2014/045192
§ 371 (c)(1),
(2) Date: Dec. 21, 2016

(87) PCT Pub. No.: WO2016/003453
PCT Pub. Date: Jan. 7, 2016

(65) Prior Publication Data
US 2017/0139889 A1    May 18, 2017

(51) Int. Cl.
*G09B 5/00* (2006.01)
*G06F 17/24* (2006.01)
*G06Q 10/10* (2012.01)
*G09B 5/02* (2006.01)
*G09B 7/02* (2006.01)

(52) U.S. Cl.
CPC ......... *G06F 17/241* (2013.01); *G06Q 10/103* (2013.01); *G09B 5/02* (2013.01); *G09B 7/02* (2013.01)

(58) Field of Classification Search
CPC ............ G06F 17/241; G09B 5/02; G09B 7/02
See application file for complete search history.

(56) References Cited

U.S. PATENT DOCUMENTS

| | | |
|---|---|---|
| 7,392,484 B1 | 6/2008 | Garfinkel |
| 8,706,685 B1 | 4/2014 | Smith et al. |
| 2003/0076352 A1 | 4/2003 | Uhlig et al. |
| 2005/0017453 A1 | 1/2005 | Rehbein et al. |
| 2009/0077479 A1* | 3/2009 | Tucci ............... G09B 5/02 715/764 |

(Continued)

OTHER PUBLICATIONS

Chiung-Hui, Chiu et al, "Integrating Reviewing Strategies into Shared Electronic Note-Taking . . . ", Computers & Education 67, 2013.

(Continued)

*Primary Examiner* — Peter R Egloff
(74) *Attorney, Agent, or Firm* — HP Inc. Patent Department (57) ABSTRACT

Example embodiments relate to digital note manipulation. In this manner, the embodiments disclosed herein enable management of a set of notes for a user, where the set of notes include a note generated for the user and a shared note generated for a set of users including the user. The shared note for the set of users may also be managed. For example, responsive to the user providing an edit to the shared note, a second note may be generated for the user, where the second note comprises the shared note and the edit provided by the user.

15 Claims, 3 Drawing Sheets

(56) References Cited

U.S. PATENT DOCUMENTS

| | | | |
|---|---|---|---|
| 2011/0123974 A1* | 5/2011 | Steinglass | H02H 7/1206 |
| | | | 434/362 |
| 2011/0202825 A1 | 8/2011 | Volsky | |
| 2012/0233534 A1 | 9/2012 | Vanderwende et al. | |
| 2013/0047115 A1 | 2/2013 | Migos et al. | |
| 2013/0342470 A1* | 12/2013 | Acar | G09B 5/062 |
| | | | 345/173 |
| 2014/0019562 A1 | 1/2014 | LeChevalier et al. | |
| 2014/0047308 A1 | 2/2014 | Chub et al. | |
| 2014/0075281 A1* | 3/2014 | Rubin | G06F 17/241 |
| | | | 715/230 |
| 2014/0149857 A1* | 5/2014 | Vagell | G06F 17/241 |
| | | | 715/255 |
| 2014/0331126 A1* | 11/2014 | Hunter | G06F 17/2288 |
| | | | 715/256 |

OTHER PUBLICATIONS

Tschida, C et al, "DenVog Adds tons of New Features and Enhancements to their acclaimed note", Mar. 13, 2012.

\* cited by examiner

DIGITAL NOTE MANIPULATION

BACKGROUND

The proliferation and availability of digital media, including e-books and other digital texts, has impacted the way in which individuals read and consume text. A computing device may enable annotation of predetermined types of digital text with highlights, comments, and/or other types of digital notes.

BRIEF DESCRIPTION OF THE DRAWINGS

The following detailed description references the drawings, wherein.

DETAILED DESCRIPTION

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

A computing device may enable annotation of predetermined types of digital text with highlights, comments, and/or other types of digital notes. Once a digital note is generated, however, the ability to interact with that note may be limited.

Example embodiments disclosed herein address this issue by facilitating manipulation of digital notes. A computing device may allow a user to manage a set of notes, where that set of notes include notes generated for the user and shared notes generated for a set of users which include the user. The computing device may also automatically generate flash cards for the user based on the set of notes for the user, without requiring interaction by the user. The computing device may further prepare a subset of notes for display in predetermined formats for printing, such that various different subsets of notes of a user may be displayed and arranged in the same predetermined format for printing.

Figure 1:
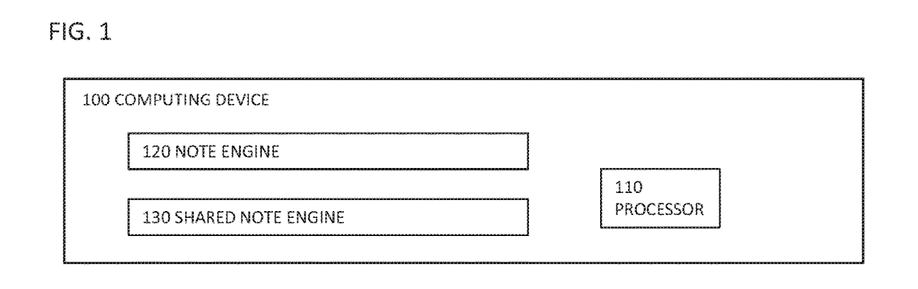
FIG. 1 is a block diagram of an example computing device for digital note manipulation.

Referring now to the drawings, FIG. 1 is a block diagram of an example computing device for digital note manipulation. Computing device 100 may comprise storage media for digital note manipulation such as, for example, one or more arrays of magnetic disk drives, solid state drives, optical, magneto-optical, or electro-optical storage media, storage media configured to implement RAID redundancy, cloud-based storage, storage media capable of handling big data, and/or other types of storage suitable for executing the functionality described below. In the example depicted in FIG. 1, computing device 100 includes a non-transitory machine-readable storage medium and a processor 110.

Processor 110 may be one or more central processing units (CPUs), microprocessors, and/or other hardware devices suitable for retrieval and execution of instructions stored in machine-readable storage medium. Processor 110 may fetch, decode, and execute program instructions to manage digital note manipulation, as described below. As an alternative or in addition to retrieving and executing instructions, processor 110 may include one or more electronic circuits comprising a number of electronic components for performing the functionality of one or more of instructions.

In one example, the program instructions can be part of an installation package that can be executed by processor 110 to implement the functionality described herein. In this case, machine-readable storage medium may be a portable medium such as a CD, DVD, or flash drive or a memory maintained by a computing device from which the installation package can be downloaded and installed. In another example, the program instructions may be part of an application or applications already installed on computing device 100.

Machine-readable storage medium may be any hardware storage device for maintaining data accessible to computing device 100. For example, machine-readable storage medium may include one or more hard disk drives, solid state drives, tape drives, and/or any other storage devices. The storage devices may be located in computing device 100 and/or in another device in communication with computing device 100. For example, machine-readable storage medium may be any electronic, magnetic, optical, or other physical storage device that stores executable instructions. Thus, machine-readable storage medium may be, for example, Random Access Memory (RAM), an Electrically-Erasable Programmable Read-Only Memory (EEPROM), a storage drive, an optical disc, and the like. As described in detail below, machine-readable storage medium may be encoded with executable instructions for digital note manipulation. As detailed below, storage medium may maintain and/or store the data and information described herein.

As discussed further below, the computing device 100 may facilitate digital note manipulation. As detailed below, computing device 100 may include a series of engines 120-130 for digital note manipulation. Each of the engines may generally represent any combination of hardware and programming. For example, the programming for the engines may be processor executable instructions stored on a non-transitory machine-readable storage medium and the hardware for the engines may include at least one processor of the computing device 100 to execute those instructions. In addition or as an alternative, each engine may include one or more hardware devices including electronic circuitry for implementing the functionality described below.

Note engine 120 may manage a respective set of notes for a plurality of users. A set of notes may comprise notes generated for the user. The set of notes may also comprise a shared note generated for a set of users. For example, note engine 120 may manage a first set of notes for a first user. The first set of notes may include, for example, a first note generated for the first user and a shared note generated for a set of users, where the set of users includes the first user. More details regarding a note as well as the generation and management of notes may be found, for example, in co-pending PCT Patent Application No. PCT/US2014/040491, titled "DIGITAL NOTE CREATION," which is hereby incorporated by reference in its entirety.

Note engine 120 may facilitate interaction by the first user with a note in the first set of notes for the first user. For example, the note engine 120 may manage a set of permissions for each individual note in a set of notes, may generate a digital group watermark for a shared note, may facilitate searching for notes external to a user's set of notes, may arrange subsets of a set of note in a predetermined format for printing, and/or may provide other functionality for managing notes.

The note engine 120 may manage a set of permissions for each individual note in a set of notes. A set of permissions to be managed for a note may depend upon whether the note is an individual note (e.g., generated for a single user) or a shared note (e.g., generated for a set of users). The set of permissions for an individual note may comprise, for example, permission to edit the note, permission to delete the note, permission to change metadata for the note, permission to share the note, permission to associate the note with another note, and/or other permissions related to interaction with the note. The set of permissions for a shared note may comprise, for example, permissions similar to the permissions for an individual note but may also comprise a subset of users associated with each permission. The subset of users associated with a permission may comprise the users that have permission to undertake the associated interaction. For example, the note engine 120 may allow a first user associated with a permission to edit a shared note may make revisions to the note and may accept the revisions made by the first user into the shared note. In some examples, the set of permissions for a shared note may also comprise permission to accept an edit to the note, permission to share the note with another user, and/or other permissions related to interaction with the shared note.

The note engine 120 may receive the set of permissions for an individual note and/or a shared note from an administrator. For example, in a context of a school, the set of users may comprise students and the administrator may comprise a teacher, principal, and/or other school official. The note engine 120 may receive a set of permissions for a note from the administrator. An administrator may have a full set of permissions to each note available in the system, each note for a user with which they are associated, and/or other subset of notes related to the administrator. In other examples, the set of permissions may be predetermined and stored in the non-transitory machine-readable storage medium of the computing device 100.

The note engine 120 may generate a digital group watermark for a shared note. The digital group watermark may comprise, for example, a watermark that encodes information related to the set of users associated with the shared note. The digital group watermark may also comprise metadata associated with the shared note, including, for example, content from the source associated with the shared note, a time and date of creation of the shared note, a time, date, and user associated with a last edit of the shared note, information related to the set of permissions for the shared note, and/or other information related to the shared note.

The note engine 120 may include the digital group watermark as content of the note, may cause the digital group watermark with the shared note in an interaction with the shared note, may cause the digital group watermark to be printed with the printing of the shared note (e.g., embossed on the printed shared note, on top of content of the shared note, in a white space of the shared note, and/or otherwise printed with the shared note), and/or may otherwise associate the digital group watermark with the shared note.

In some examples, the digital group watermark may comprise information the same as or similar to the watermark described in co-pending PCT Patent Application No. PCT/US2014/040491 incorporated by reference above. The note engine 120 may use the digital group watermark in a manner that is the same as or similar to the use of a digital watermark for an individual note (e.g., as described in the co-pending PCT Patent Application No. PCT/US2014/040491 incorporated by reference above).

The note engine 120 may facilitate searching for and/or including notes external to a user's set of notes. For example, the note engine 120 may receive search input from the first user. The search input may comprise, for example, keywords and/or key topics for content of a note, keywords and/or key topics for metadata of a note, information related to a user or multiple users associated with a note, information related to an administrator of a note, one or more permissions associated with a note, and/or other criteria by which notes may be searched.

The note engine 120 may determine a set of external notes that match the criteria included in the search input received from the first user. The set of external notes may comprise notes from multiple users, individual notes, shared notes, any combination thereof, and/or other types of notes that match the criteria included in the search input. The note engine 120 may provide access, for the first user, to information related to the set of external notes. In some examples, the note engine 120 may allow a user to include one or more notes from the set of external notes in the set of notes for the first user. The note engine 120 may allow the user to include an external note based on a set of permissions associated with the external note, based on requesting permission from the user or set of users associated with the external note, and/or may otherwise allow the user to include the external note.

The note engine 120 may arrange subsets of a set of notes for display in a predetermined format for printing. The predetermined format for printing may comprise, for example, printing within an 8.5×11 sheet of paper, printing within an A4 sheet of paper, and/or other predetermined format. The note engine 120 may receive information from the first user related to a subset of the set of notes for the first user to be printed. The note engine 120 may arrange the subset of notes for display within a predetermined printable format responsive to receiving a request from the first user to print the subset of the set of notes. For example, the note engine 120 may determine the dimensions and sizes of the content of each note to be displayed and automatically arrange the notes for display within the predetermined format for printing. To that end, the note engine 120 may automatically re-size one or more notes in the subset of notes and/or otherwise format one or more notes such that each note in the subset of notes may be displayed within the predetermined format for printing.

As such, the note engine 120 may arrange for display any subset of notes for the first user within the same predetermined printable format. For example, the note engine 120 may arrange for display a first subset of notes with a first number of notes with a first amount of content and metadata to be printed in the predetermined printable format and may arrange for display in the predetermined printable format a second subset of notes with a second number of notes with a second amount of content and metadata to be printed that is different from the first subset of notes.

The note engine 120 may comprise other functionality related to managing sets of notes and is not limited to the examples described herein.

Shared note engine 130 may manage a shared note for a set of users. A shared note may comprise, for example, a note generated for a user which the user chooses to share with others, a note generated for a set of users (in a manner similar to the generation of an individual note), and/or other type of shared annotation. For example, shared note engine 130 may manage interaction by a user with the shared note, and/or other functionality that may be performed for a shared note.

In some examples, responsive to a user sharing an individual note with another user or a set of other users, the shared note engine 130 may generate a shared note with content and metadata similar to the individual note being shared. The shared note engine 130 (and/or the note engine 120) may also manage permissions for the shared note. The shared note engine 130 may receive permissions settings from the user sharing the note, may use default permissions setting for the shared note, may receive permissions settings from an administrator associated with the user and/or the set of users, and/or may otherwise determine the permissions for the shared note.

The shared note engine 130 may receive a request from a user of the set of users for whom a note is shared to make an edit to the note (and/or may receive an edit to the note from the user). Responsive to a user providing an edit to a shared note, the shared note engine 130 may generate a second note for the user, where the second note comprises the shared note and the edit to the shared note. The shared note engine 130 (and/or the note engine 120) may accept the edit provided by the user into the shared note based on the set of permissions associated with the shared note. As such, each user may have their own instance of a shared note, as well as the shared note itself, in their set of notes. A user's instance of the shared note and the shared note may be identical or may have differences in content, metadata, and/or other information.

Shared note engine 130 may comprise other functionality related to managing the shared note and is not limited to the examples described herein.

Figure 2:
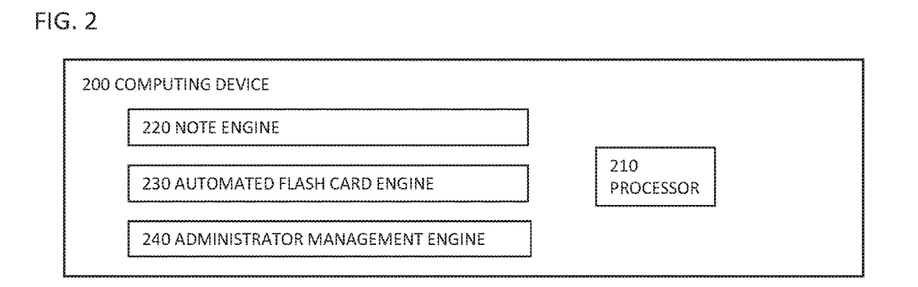
FIG. 2 is a block diagram of an example computing device for digital note manipulation.

FIG. 2 is a block diagram of an example computing device for digital note manipulation. Computing device 200 may comprise storage media for digital note manipulation such as, for example, one or more arrays of magnetic disk drives, solid state drives, optical, magneto-optical, or electro-optical storage media, storage media configured to implement RAID redundancy, cloud-based storage, storage media capable of handling big data, and/or other types of storage suitable for executing the functionality described below. In the example depicted in FIG. 2, computing device 200 includes a non-transitory machine-readable storage medium and a processor 210.

Processor 210 may be one or more central processing units (CPUs), microprocessors, and/or other hardware devices suitable for retrieval and execution of instructions stored in machine-readable storage medium. Processor 210 may fetch, decode, and execute program instructions to manage digital note manipulation, as described below. As an alternative or in addition to retrieving and executing instructions, processor 210 may include one or more electronic circuits comprising a number of electronic components for performing the functionality of one or more of instructions.

In one example, the program instructions can be part of an installation package that can be executed by processor 210 to implement the functionality described herein. In this case, machine-readable storage medium may be a portable medium such as a CD, DVD, or flash drive or a memory maintained by a computing device from which the installation package can be downloaded and installed. In another example, the program instructions may be part of an application or applications already installed on computing device 200.

Machine-readable storage medium may be any hardware storage device for maintaining data accessible to computing device 200. For example, machine-readable storage medium may include one or more hard disk drives, solid state drives, tape drives, and/or any other storage devices. The storage devices may be located in computing device 200 and/or in another device in communication with computing device 200. For example, machine-readable storage medium may be any electronic, magnetic, optical, or other physical storage device that stores executable instructions. Thus, machine-readable storage medium may be, for example, Random Access Memory (RAM), an Electrically-Erasable Programmable Read-Only Memory (EEPROM), a storage drive, an optical disc, and the like. As described in detail below, machine-readable storage medium may be encoded with executable instructions for digital note manipulation. As detailed below, storage medium may maintain and/or store the data and information described herein.

As discussed further below, the computing device 200 may facilitate digital note manipulation.

As detailed below, computing device 200 may include a series of engines 220-240 for digital note manipulation. Each of the engines may generally represent any combination of hardware and programming. For example, the programming for the engines may be processor executable instructions stored on a non-transitory machine-readable storage medium and the hardware for the engines may include at least one processor of the computing device 200 to execute those instructions. In addition or as an alternative, each engine may include one or more hardware devices including electronic circuitry for implementing the functionality described below.

Note engine 220 may manage a set of notes for a first user. Note engine 220 may comprise functionality that is similar or the same as note engine 120 of FIG. 1.

Automated flash card engine 230 may automatically generate a set of flash cards for a first user based on the set of notes for the first user, without interaction from the first user. For example, automated flash card engine 230 may generate the set of flash cards for the first user regardless of whether the automated flash card engine 230 receives a request from the first user for the set of flash cards. In some examples, the automated flash card engine 230 may generate the set of flash cards at predetermined intervals, at random intervals, responsive to notes related to a source being included in the set of notes, and/or based on other criteria. In some examples, the automated flash card engine 230 may generate the set of flash cards responsive to receiving a request from an administrator to generate the set of flash cards.

In some examples, the automated flash card engine 230 may generate a corresponding answer related to content in each individual flash card generated. As discussed further below, the corresponding answer may relate to content obscured from the flash card.

The automated flash card engine 230 may generate the set of flash cards based on one or more of: content of a note in the set of notes, metadata associated with a note in the set of notes, information from a source related to a note in the set of notes, external data related to one or more sources related to the set of notes, and/or based on other information related to the set of notes.

In some examples, the automated flash card engine 230 may also generate the set of flash cards based on keywords, topics, and/or other information provided by an administrator requesting the set of flash cards. In these examples, the administrator may also provide information to be obscured from the flash cards, such that the flash cards may be used as a quiz for the user.

The automated flash card engine 230 may request (and/or require) the user to provide answers related to the obscured information in the set of flash cards. The automated flash card engine 230 may determine the information to obscure by determining content for the flash card and using machine learning and/or text and subject recognition to determine key words in the content of the flash card. The automated flash card engine 230 may request (and/or require) answers during a quiz, based on a request from an administrator, based on a request from a user, and/or based on other criteria. In other examples, the automated flash card engine 230 may receive the content in the flash card to be obscured from the administrator, from a user, and/or may otherwise determine the content to be obscured.

In some examples, the automated flash card engine 230 may generate a set of flash cards for a user based on information associated with the user. As such, the automated flash card engine 230 may generate a first set of flash card for a first user based on a set of notes and may generate a second set of flash cards for a second user based on the same set of notes, where the second set of flash cards may be the same as or different from the first set of flash cards. The information associated with the user may comprise, for example, information obtained from an administrator, information related to characteristics associated with the user (e.g., grade level of the user, previous grades of the user, user's interaction with the set of notes, user's previous interaction with the flash cards, source requesting the flash cards, and/or other characteristics), whether the set of notes associated with the user comprises shared notes, and/or other information related to the user and/or the set of notes. In some examples, the automated flash card engine 230 may generate different sets of flash cards for different users based on the same set of notes responsive to instructions from an administrator.

Automated flash card engine 230 may comprise other functionality related to managing flash cards and is not limited to the examples described herein.

Administrator management engine 240 may provide access, for an administrator, a plurality of sets of notes, where each set of notes is for a user associated with the administrator. The administrator management engine 240 may also enable an administrator to view notes, provide and/or revise a set of permissions for a note, request a set of flash cards to be generated for a user (or set of users), receive answers related to the set of flash cards from a user, provide keywords and/or key topics for a set of notes, and/or otherwise interact with the plurality of sets of notes.

Administrator management engine 240 may comprise other functionality related to administrator management and is not limited to the examples described herein.

Figure 3:
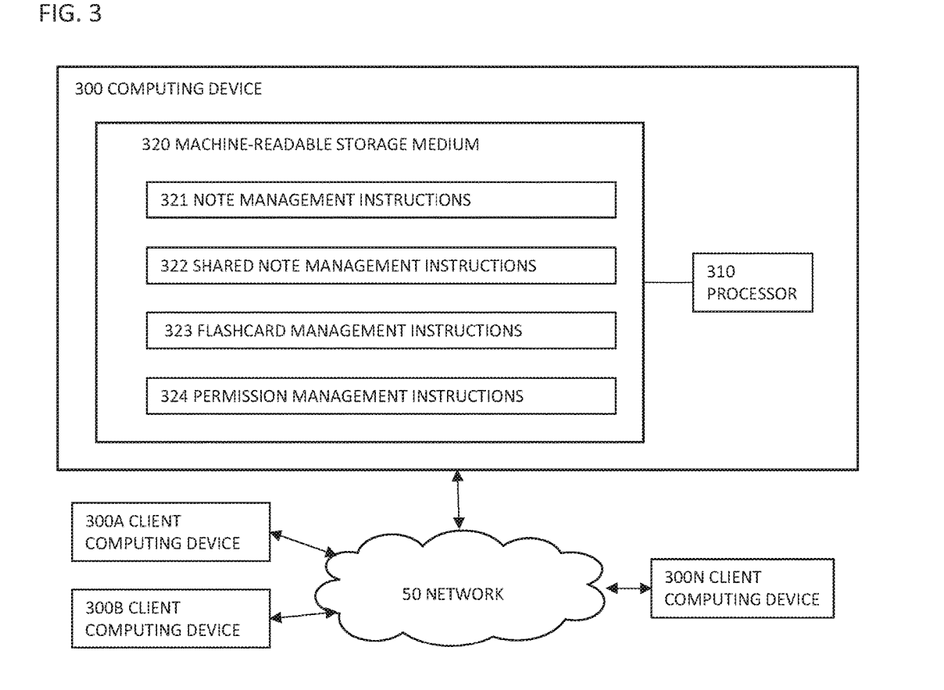
FIG. 3 is a block diagram of an example computing device for digital note manipulation in communication with client computing devices over a network.

FIG. 3 is a block diagram of an example computing device for digital note manipulation in communication with client computing devices over a network. In the example depicted in FIG. 3, the computing device 300 may be part of a system that comprises client computing devices 300A, 300B, . . . , 300N that may be communicably coupled via a network 50. The network 50 may be any wired, wireless and/or other type of network via which the computing devices 300, 300A, 300B, . . . , 300N may communicate. Client computing devices 300A, 300B, . . . , 300N may comprise computing devices of users, administrators, and/or other entities. In some examples, client computing devices 300A, 300B, . . . , 300N may comprise functionality similar to computing device 300 and may be used by users, administrators, and/or other entities to generate, share, and/or otherwise interact with notes.

Computing device 300 may comprise storage media for digital note manipulation such as, for example, one or more arrays of magnetic disk drives, solid state drives, optical, magneto-optical, or electro-optical storage media, storage media configured to implement RAID redundancy, cloud-based storage, storage media capable of handling big data, and/or other types of storage suitable for executing the functionality described below. In the example depicted in FIG. 3, computing device 300 includes a non-transitory machine-readable storage medium 320 and a processor 310.

Processor 310 may be one or more central processing units (CPUs), microprocessors, and/or other hardware devices suitable for retrieval and execution of instructions stored in machine-readable storage medium 3.

Processor 310 may fetch, decode, and execute program instructions 621, and/or other instructions to enable digital note manipulation, as described below. As an alternative or in addition to retrieving and executing instructions, processor 310 may include one or more electronic circuits comprising a number of electronic components for performing the functionality of one or more of program instructions 321, 322, 323, 324, and/or other instructions.

In one example, the program instructions can be part of an installation package that can be executed by processor 310 to implement the functionality described herein. In this case, machine-readable storage medium 320 may be a portable medium such as a CD, DVD, or flash drive or a memory maintained by another computing device from which the installation package can be downloaded and installed. In another example, the program instructions may be part of an application or applications already installed on computing device 300.

Machine-readable storage medium 320 may be any hardware storage device for maintaining data accessible to computing device 300. For example, machine-readable storage medium 320 may include one or more hard disk drives, solid state drives, tape drives, and/or any other storage devices. The storage devices may be located in computing device 300 and/or in another device in communication with computing device 300. For example, machine-readable storage medium 320 may be any electronic, magnetic, optical, or other physical storage device that stores executable instructions. Thus, machine-readable storage medium 320 may be, for example, Random Access Memory (RAM), an Electrically-Erasable Programmable Read-Only Memory (EEPROM), a storage drive, an optical disc, and the like. As detailed below, storage medium 620 may maintain and/or store the data and information described herein.

Machine-readable storage medium 320 may also be encoded with executable instructions for enabling execution of the functionality described herein. For example, machine-readable storage medium 320 may store instructions 321, 322, 323, 324, and/or other instructions that may be used to carry out the functionality of the invention.

Note management instructions 321, when executed by processor 310, may manage sets of notes for users, where a set of notes for a first user may comprise a note generated for the first user and a shared note generated for a set of users including the first user. In some examples, the functionality performed by the note management instructions 321, when executed by processor 310, may be the same as or similar to functionality performed by note engine 120 of computing device 100.

Shared note management instructions 322, when executed by processor 310, may manage shared notes for users. In some examples, the functionality performed by the shared note management instructions 322, when executed by processor 310, may be the same as or similar to functionality performed by shared note engine 130 of computing device 100.

Flash card management instructions 323, when executed by processor 310, may automatically generate a set of flash cards for a user based on the set of notes for that user. In some examples, the functionality performed by the flash card management instructions 323, when executed by processor 310, may be the same as or similar to functionality performed by flash card management 230 of computing device 200.

Permission management instructions 324, when executed by processor 310, may manage a set of permissions for each individual note in the sets of notes for users. In some examples, the functionality performed by the permission management instructions 324, when executed by processor 310, may be the same as or similar to functionality performed by note engine 120 of computing device 100.

Figure 4:
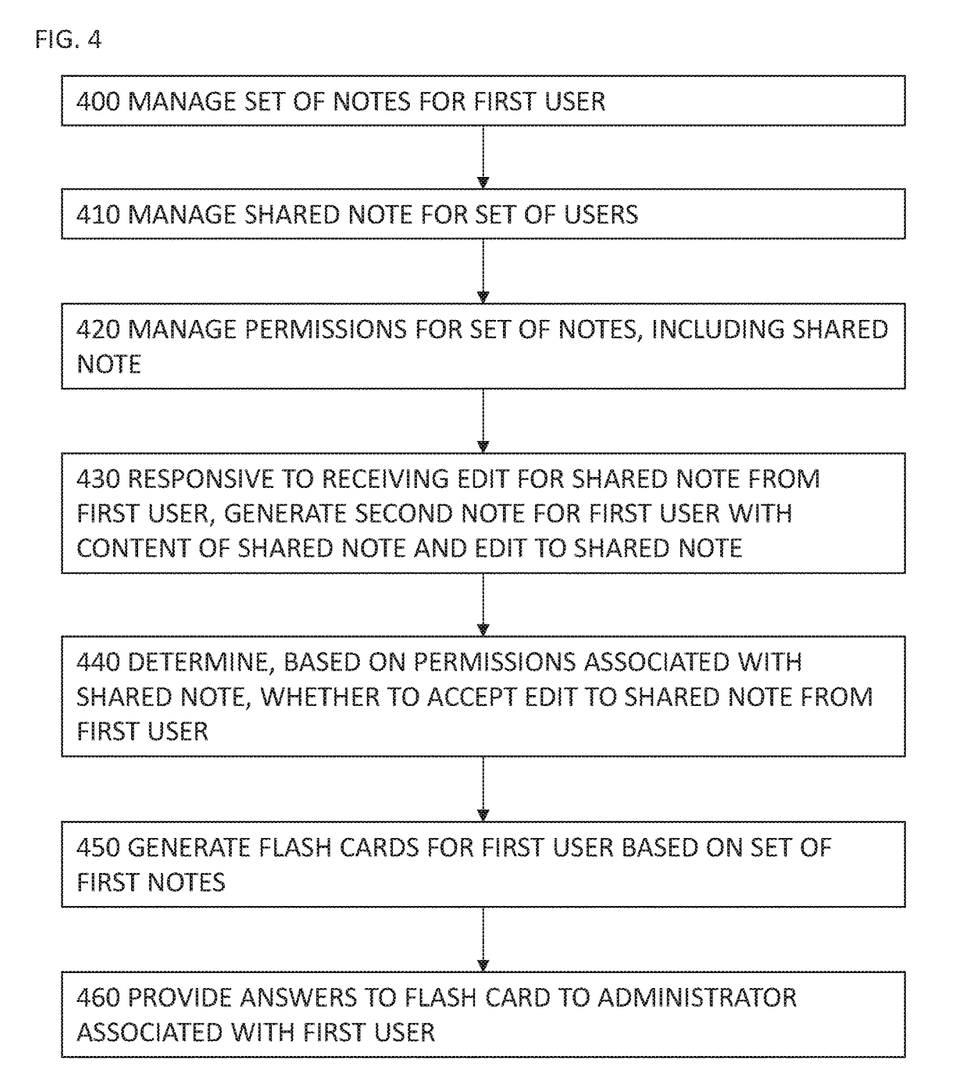
FIG. 4 is a flowchart of an example method for execution by a computing device for digital note manipulation.

FIG. 4 is a flowchart of an example method for execution by a computing device for digital note manipulation. Although execution of the method described below is with reference to computing device 100 of FIG. 1, other suitable devices for execution of this method will be apparent to those of skill in the art (e.g., computing device 200 of FIG. 2, computing device 300 of FIG. 3, and/or other computing devices). The method described in FIG. 4 and other figures may be implemented in the form of executable instructions stored on a machine-readable storage medium of computing device 300, by one or more engines described herein, and/or in the form of electronic circuitry.

In an operation 400, a set of notes for a first user may be managed. For example, the computing device 100 (and/or the note engine 120, or other resource of the computing device 100) may manage the set of notes. The computing device 100 may manage the set of notes in a manner similar or the same as that described above in relation to the execution of the note engine 120, and/or other resource of the computing device 100.

In an operation 410, a shared note may be managed for a set of users. For example, the computing device 100 (and/or the shared note engine 130, or other resource of the computing device 100) may manage the shared note. The computing device 100 may manage the shared note in a manner similar or the same as that described above in relation to the execution of the shared not engine 130, and/or other resource of the computing device 100.

In an operation 420, permissions for the set of notes, including the shared note, may be managed. For example, the computing device 100 (and/or the note engine 120, or other resource of the computing device 100) may manage permissions for the set of notes. The computing device 100 may manage permission for the set of notes in a manner similar or the same as that described above in relation to the execution of the note engine 120, and/or other resource of the computing device 100.

In an operation 430, a second note may be generated for a first user with content of a shared note and an edit to a shared note responsive to receiving the edit for the shared note from the user. For example, the computing device 100 (and/or the shared note engine 130, or other resource of the computing device 100) may generated the second note. The computing device 100 may generate the second note in a manner similar or the same as that described above in relation to the execution of the shared note engine 130, and/or other resource of the computing device 100.

In an operation 440, a determination may be made as to whether to accept the edit to the shared note based on permissions associated with the shared note. For example, the computing device 100 (and/or the shared note engine 130, or other resource of the computing device 100) may determine whether to accept the edit. The computing device 100 determine whether to accept the edit in a manner similar or the same as that described above in relation to the execution of the shared note engine 130, and/or other resource of the computing device 100.

In an operation 450, flash cards may be generated for a user based on the set of notes for the user. For example, the computing device 100 (and/or the automated flash card engine 140, or other resource of the computing device 100) may generate the flash cards. The computing device 100 may generate the flash cards in a manner similar or the same as that described above in relation to the execution of the automated flash card engine 140, and/or other resource of the computing device 100.

Figure 4A:
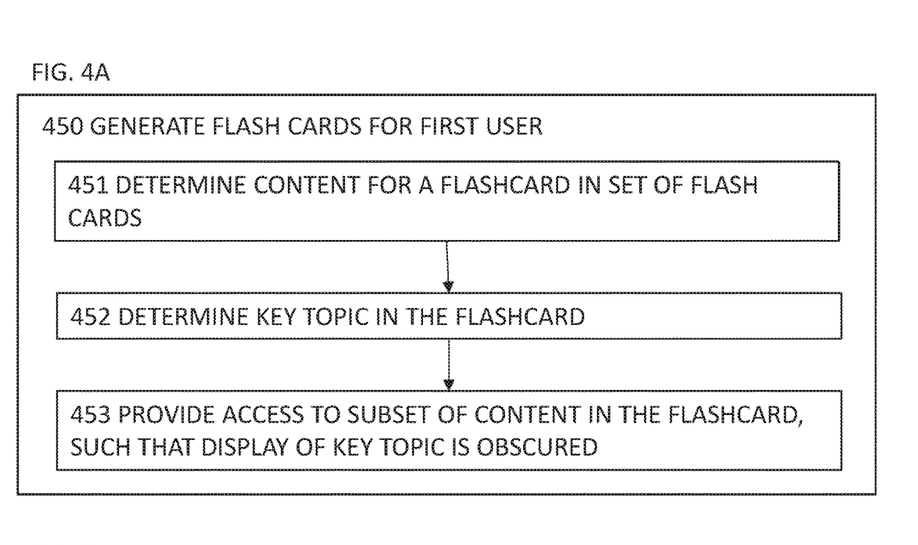
FIG. 4A is a flowchart of an example method for execution by a computing device for generating flash cards for a user.

In some examples, the flash cards may be generated in various manners. FIG. 4A is a flowchart of an example method for execution by a computing device for generating flash cards for a user.

In an operation 451, content for a flash card in a set of flash cards may be determined. For example, the computing device 100 (and/or the automated flash card engine 140, or other resource of the computing device 100) may determine content for a flash card. The computing device 100 may determine content for a flash card in a manner similar or the same as that described above in relation to the execution of the automated flash card engine 140, and/or other resource of the computing device 100.

In an operation 452, a key topic in the flashcard may be determined. For example, the computing device 100 (and/or the automated flash card engine 140, or other resource of the computing device 100) may determine the key topic. The computing device 100 may determine the key topic in a manner similar or the same as that described above in relation to the execution of the automated flash card engine 140, and/or other resource of the computing device 100.

In an operation 453, access to a subset of content in the flash card may be provided such that display of the key topic is obscured. For example, the computing device 100 (and/or the automated flash card engine 140, or other resource of the computing device 100) may provide access to the subset of content in the flash card. The computing device 100 may provide access to the subset of content in the flash card in a manner similar or the same as that described above in relation to the execution of the automated flash card engine 140, and/or other resource of the computing device 100.

Returning to FIG. 4, in an operation 460, an answer to a flash card may be provided to an administrator associated with the user. For example, the computing device 100 (and/or the automated flash card engine 140, or other resource of the computing device 100) may provide the answer. The computing device 100 may provide the answer in a manner similar or the same as that described above in relation to the execution of the automated flash card engine 140, and/or other resource of the computing device 100.

Figure 5:
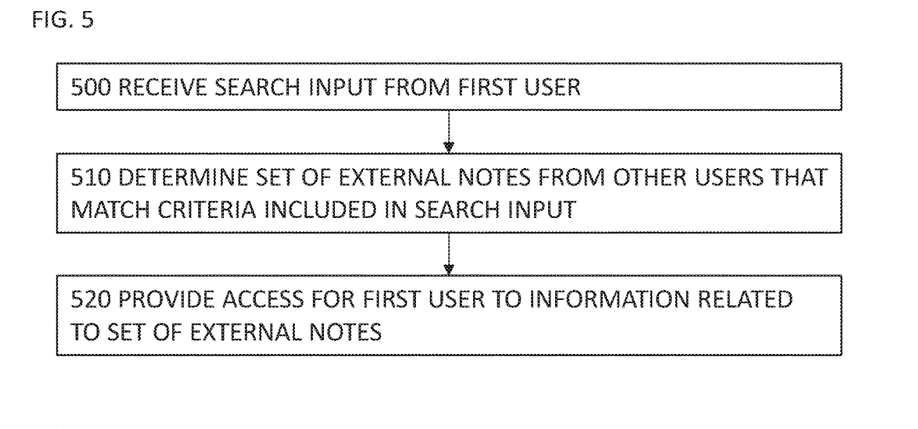
FIG. 5 is a flowchart of an example method for execution by a computing device for digital note manipulation.

FIG. 5 is a flowchart of an example method for execution by a computing device for digital note manipulation.

In an operation 500, search input may be received from a user. For example, the computing device 100 (and/or the note engine 120, or other resource of the computing device 100) may receive the search input. The computing device 100 may receive the search input in a manner similar or the same as that described above in relation to the execution of the note engine 120, and/or other resource of the computing device 100.

In an operation 510, a set of external notes from other users that match criteria included in the search input may be determined. For example, the computing device 100 (and/or the note engine 120, or other resource of the computing device 100) may determine the set of external notes. The computing device 100 may determine the set of external notes in a manner similar or the same as that described above in relation to the execution of the note engine 120, and/or other resource of the computing device 100.

In an operation 520, the user may be provided access to information related to the set of external notes. For example, the computing device 100 (and/or the note engine 120, or other resource of the computing device 100) may provide access to the set of external notes. The computing device 100 may provide access to the set of external notes in a manner similar or the same as that described above in relation to the execution of the note engine 120, and/or other resource of the computing device 100.

Figure 6:
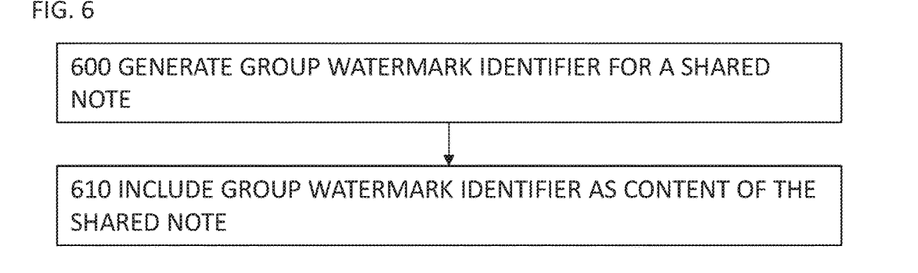
FIG. 6 is a flowchart of an example method for execution by a computing device for digital note manipulation.

FIG. 6 is a flowchart of an example method for execution by a computing device for digital note manipulation.

In an operation 600, a group watermark identifier may be generated for a shared note. For example, the computing device 100 (and/or the note engine 120, or other resource of the computing device 100) may generate the group watermark identifier. The computing device 100 may generate the group watermark identifier in a manner similar or the same as that described above in relation to the execution of the note engine 120, and/or other resource of the computing device 100.

In an operation 610, the group watermark identifier may be included as content of the shared note. For example, the computing device 100 (and/or the note engine 120, or other resource of the computing device 100) may include the group watermark identifier as content of the shared note. The computing device 100 may include the group watermark identifier as content of the shared note in a manner similar or the same as that described above in relation to the execution of the note engine 120, and/or other resource of the computing device 100.

The foregoing disclosure describes a number of example embodiments for digital note manipulation. The disclosed examples may include systems, devices, computer-readable storage media, and methods for digital note manipulation. For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

We claim:

1. A system for digital note manipulation, comprising:
a processor; and
a non-transitory machine-readable storage medium storing instructions that when executed cause the processor to:
  manage a set of digital notes for a first user at a first computing device, wherein the first computing device of the first user is in communication with other computing devices of other users via a network, and wherein the set of digital notes includes a shared note to be shared among a group of users that includes the first user and the other users;
  responsive to receiving an edit to the shared note from the first user, determine to accept the edit to the shared note based on a permission associated with the shared note and generate an edited shared note for the first user;
  store both the shared note and the edited shared note in the set of digital notes for the first user;
  automatically generate a set of digital flash cards for the first user based on the set of digital notes, wherein the set of digital flash cards is automatically generated without interaction from the first user;
  automatically determine a keyword from content of the set of digital flashcards;
  obscure information related to the keyword in the set of digital flash cards;
  for each individual flash card in the set of digital flash cards, generate a corresponding answer related to the obscured information in the individual flash card; and
  display, in a predetermined format for printing, the set of digital flash cards having the obscured information and the corresponding answers for the first user.

2. The system of claim 1, wherein the instructions are executable to cause the processor to:
provide access, for an administrator, to a plurality of sets of digital notes, wherein each set of digital notes in the plurality of set of digital notes is generated for a user associated with the administrator.

3. The system of claim 2, wherein the instructions are executable to cause the processor to:
automatically generate the set of digital flash cards for the first user responsive to receiving a request from the administrator to generate the set of digital flash cards.

4. The system of claim 3, wherein the instructions are executable to cause the processor to:
generate the set of digital flash cards based on one or more of: content of a note in the set of digital notes, metadata associated with a note in the set of digital notes, and information from a source related to a note in the set of digital notes.

5. The system of claim 4, wherein, to obscure the information related to the keyword from the set of digital flash cards, the instructions are executable to cause the processor to:

determine content for a flashcard in the set of digital flash cards;

determine the keyword based on the content in the flashcard;

provide access to a subset of the content in the flashcard related to the keyword, such that display of the subset of the content related to the keyword is obscured.

6. A non-transitory computer readable storage medium storing instructions for digital note manipulation, wherein the instructions are executable by a processor of a computing device to cause the processor to:

manage a set of digital notes for a first user at the computing device, wherein the computing device of the first user is connected to other computing devices of other users via a network, and wherein the set of digital notes includes a shared note generated for a first set of users, the first set of users including the first user and the other users;

responsive to receiving an edit to the shared note from the first user, determine to accept the edit to the shared note based on a permission associated with the shared note and generate an edited shared note for the first user;

store both the shared note and the edited shared note in the set of digital notes for the first user;

automatically generate a set of digital flash cards for the first user based on the set of digital notes for the first user;

automatically determine a keyword from content of the set of digital flashcards;

obscure information related to the keyword in the set of digital flash cards;

generate answers corresponding to the obscured information in the set of digital flash cards; and display, in a predetermined format for printing, the set of digital flash cards having the obscured information and the corresponding answers for the first user.

7. The non-transitory computer readable storage medium of claim 6, further comprising instructions executable by the processor of the computing device to:

manage a set of permissions for each individual note in the set of digital notes, wherein the set of permissions comprises one or more of: permission to edit the note, permission to delete the note, and permission to accept an edit to a shared note, and wherein the first user in the set of users has a first set of permissions, a second user in the set of users has a second set of permissions different from the first set of permissions, and an administrator associated with each user in the first set of users has a full set of permissions for each individual note in the set of digital notes.

8. The non-transitory computer readable storage medium of claim 7, wherein the instructions are executable by the processor of the computing device to:

generate the set of flash cards based on one or more of: content of a note in the set of digital notes, metadata associated with a note in the set of digital notes, and information from a source related to a note in the set of digital notes, wherein, to obscure the information from the set of digital flash cards, the instructions are executable to cause the processor of the computing device to:

determine content for a flashcard in the set of digital flash cards;

determine the keyword from the content of the flashcard; and provide access to a subset of the content in the flashcard related to the keyword, such that display of the subset of the content related to the keyword topic is obscured.

9. The non-transitory computer readable storage medium of claim 6, wherein the instructions are executable by the processor of the computing device to:

generate a first set of flashcards for the first user based on the set of digital notes; and generate a second set of flashcards different from the first set of flashcards for a second user based on the set of digital notes.

10. The non-transitory computer readable storage medium of claim 9, wherein the instructions are executable by the processor of the computing device to:

arrange a subset of the first set of flashcards for display within a predetermined printable format responsive to a request from the first user to print the subset of the first set of flashcards; and arrange a subset of the second set of flashcards for display within the predetermined printable format responsive to a request from the second user to print the subset of the second set of flashcards, wherein the arrangement of the subset of the second set of flashcards is different from the arrangement of the subset of the first set of flashcards, and wherein a size and number of notes in the subset of the second set of flashcards is different from a size and number of notes in the subset of the first set of flashcards.

11. A method for digital note manipulation, comprising:

managing, by a processor of a first computing device, a set of digital notes for a first user at the first computing device, wherein the first computing device of the first user is in communication with other computing devices of other users via a network, and wherein the set of digital notes includes a shared note to share with a group of users that includes the first user and the other users;

responsive to receiving an edit to the shared note from the first user, determining to accept the edit to the shared note based on a permission associated with the shared note and generating an edited shared note for the first user;

storing both the shared note and the edited shared note in the set of digital notes;

automatically generating, by the processor, a set of digital flash cards for the first user based on the set of digital notes;

automatically determining, by the processor, a keyword from content of the set of digital flashcards;

obscuring, by the processor, information related to the keyword in the set of digital flash cards;

for each individual flash card in the set of digital flash cards, generating a corresponding answer related to the obscured information in the individual flash card; and displaying, in a predetermined format for printing, the set of digital flash cards having the obscured information and the corresponding answers for the first user.

12. The method of claim 11, further comprising:

storing a set of permissions for each individual note in the set of digital notes, wherein the set of permissions comprises one or more of: a permission to edit the note, a permission to delete the note, and the permission to accept the edit to the shared note.

13. The method of claim 12, further comprising:
accept the edit to the shared note provided by the first user based on the permission to accept the edit to the shared note.

14. The method of claim 11, further comprising:
receiving a search input from the first user;
determining a set of external digital notes from the other users that match criteria included in the search input from the first user; and
providing, to the first user, access to information related to the set of external notes.

15. The method of claim 11, further comprising:
generating a digital group watermark for the shared note, wherein the digital group watermark includes information related to the group of users; and
encoding the digital group watermark as additional content on the shared note.

\* \* \* \* \*